H. W. SHERRILL.
Reversing-Pulley or Gear-Wheel.
No. 161,986. Patented April 13, 1875.
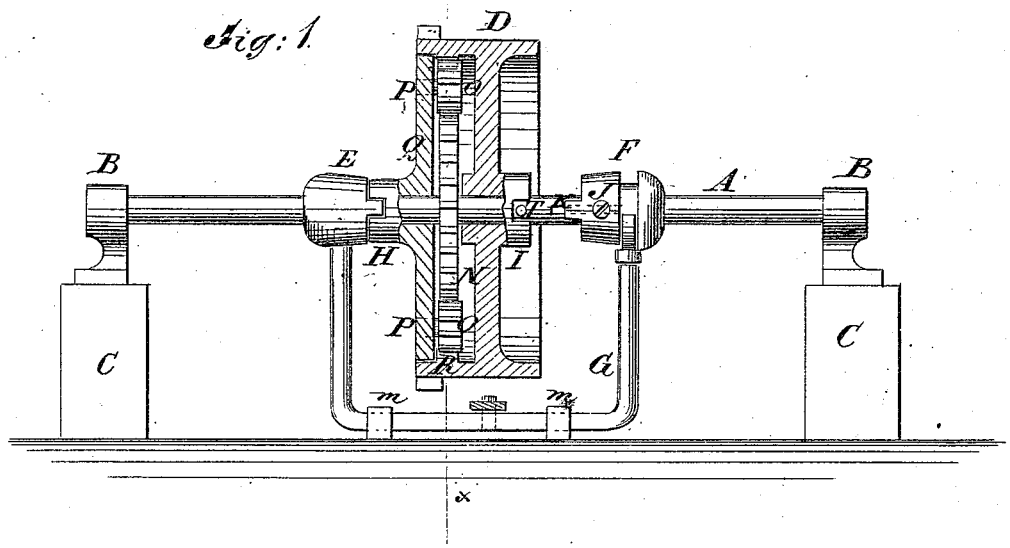
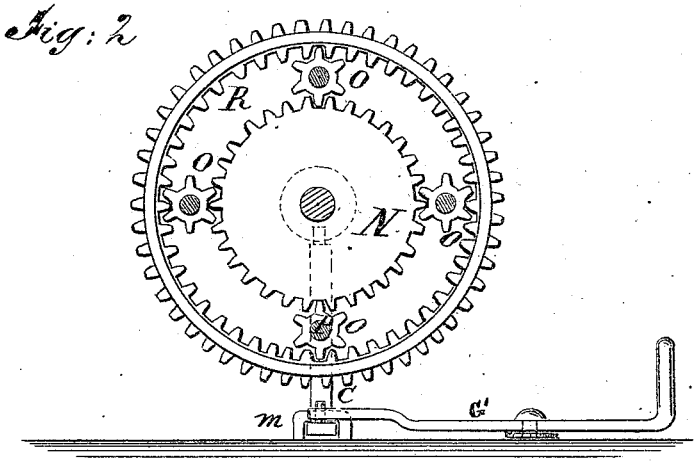
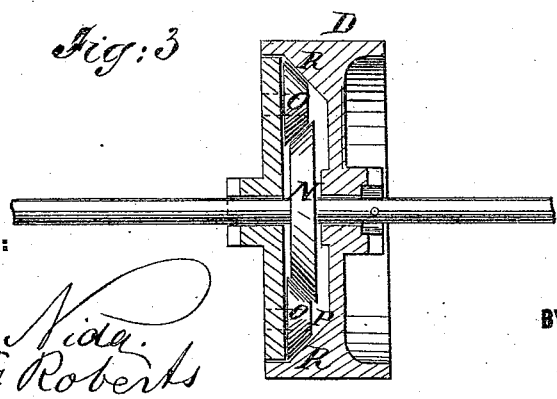
WITNESSES:
Chas. Nida.
Alex F. Roberts
INVENTOR:
H. W. Sherrill
BY Munn & Co
ATTORNEYS.

UNITED STATES PATENT OFFICE.

HENRY W. SHERRILL, OF NEW YORK, N. Y.

IMPROVEMENT IN REVERSING PULLEYS OR GEAR-WHEELS.

Specification forming part of Letters Patent No. 161,986, dated April 13, 1875; application filed August 15, 1874.

*To all whom it may concern:*

Be it known that I, HENRY W. SHERRILL, of the city, county, and State of New York, have invented a new and useful Improvement in Reversing Pulley or Gear-Wheel, of which the following is a specification:

This invention relates to a new and useful improvement in pulleys or gear-wheels, whereby the same pulley or gear is used for reversing the motion of the shaft or arbor.

In the drawing, Figure 1 represents a vertical section of a pulley and gear on the arbor, also the clutch-couplings and shifter. Fig. 2 is a vertical section of Fig. 1 taken on the line $x\,x$, and Fig. 3 is a modification, showing friction gears instead of cog-wheels for reversing the motion of the shaft.

Similar letters of reference indicate corresponding parts.

A is the shaft or arbor, which may be the arbor of a lathe or other machine. B B are the boxes on the stands C C, in which the shaft runs. D is the pulley or gear wheel. E and F are clutch-couplings, which are made to slide on the shaft A, to and from the pulley, by means of shifter G. These couplings engage with the clutches H and I of the outside plate, and of the pulley or gear. When the pulley is used for driving, or as a fast pulley on the shaft A, the clutch F, which revolves with the shaft, being held by the screw J in the slot K, it is made to engage with the clutch I.

The shifter is operated by the shifting-lever G', and is held in position by the clips M M. The clutch E does not revolve, but is made to slide back and forth on the shaft by the shifter, which enters it as seen in dotted lines in Fig. 2. N is a wheel, either cog or friction, attached rigidly to the shaft. O represents pinions or small wheels, one or more, which revolve on wrist-pins P in the outer bar or plate Q of the pulley or gear wheel. R are cogs cast on or rigidly attached to the inside of the rim of the pulley. A friction-surface may be used instead. Now, when this plate or bar Q is held stationary by the clutch H, the motion of the shaft will be opposite that of the pulley, or be reversed, the speed of the shaft being in proportion to the diameter of the fast wheel N and the small wheels O. When the clutch F is detached, and both clutches are disengaged, the pulley will freely revolve on the shaft, it being prevented from sliding by the wheel N, (which is fast on the shaft,) and by the pin T through the shaft. Instead of gear-wheels, as seen in Figs. 1 and 2, friction-wheels, substantially as seen in Fig. 3, may be employed, the effect being the same.

The advantages of the arrangement are found in the small space occupied by the single pulley or gear, and in a single belt to serve in the place of a number of belts and pulleys for producing the same effect, and in the facility with which a greater speed can be obtained in the reverse motion. It is evident that D may be a gear-wheel instead of a pulley, and the shaft reversed, as described.

Having thus described my invention, I claim as new and desire to secure by Letters Patent—

The combined fast, loose, and reversing pulley or wheel herein described, consisting of the shell or wheel D, having a clutch, I, and inner gear or friction surface R, the independent face-plate Q, carrying gear or friction wheels O, and provided with the notched hub or clutch H, all combined with the shaft A, fixed gear or friction wheel N, the sliding clutches E F, and the shifting mechanism G G', as and for the purpose specified.

HENRY W. SHERRILL.

Witnesses:
 T. B. MOSHER,
 ALEX. F. ROBERTS.